United States Patent [19]

Nishimatsu et al.

[11] Patent Number: 4,560,617
[45] Date of Patent: Dec. 24, 1985

[54] MAGNETIC RECORDING MEDIUM

[75] Inventors: Masaharu Nishimatsu; Yuichi Kubota; Kazunori Tamazaki; Shigeru Shimada, all of Tokyo, Japan

[73] Assignee: TDK Corporation, Tokyo, Japan

[21] Appl. No.: 588,903

[22] Filed: Mar. 12, 1984

[30] Foreign Application Priority Data

Mar. 25, 1983 [JP] Japan .................................. 58-50795

[51] Int. Cl.⁴ .............................................. G11B 5/70
[52] U.S. Cl. .............................. 428/423.1; 252/62.54;
360/134; 360/135; 360/136; 428/423.7;
428/522; 428/521; 428/694; 428/900; 428/328;
428/329; 427/44; 427/128
[58] Field of Search ................... 427/44, 128; 428/694,
428/695, 900, 423.1, 480, 522, 328, 329, 521;
360/134–136; 252/62.54

[56] References Cited

U.S. PATENT DOCUMENTS

| 4,368,239 | 1/1983 | Nakajima | 428/520 |
| 4,400,435 | 8/1983 | Yoda | 428/425.9 |
| 4,409,299 | 10/1983 | Mizuno | 428/694 |
| 4,415,630 | 11/1983 | Kubota | 428/457 |
| 4,431,712 | 3/1984 | Matsufuji | 428/694 |
| 4,434,210 | 2/1984 | Nakajima | 427/44 |
| 4,476,035 | 10/1984 | Miyoshi | 428/694 |
| 4,481,231 | 11/1984 | Hashimoto | 427/44 |

Primary Examiner—Ellis P. Robinson
Attorney, Agent, or Firm—Oblon, Fisher, Spivak, McClelland & Maier

[57] ABSTRACT

A magnetic recording medium comprising fine ferromagnetic particles as the main component and a binder composed of a mixture of a radiation sensitive soft resin, a radiation sensitive modified resin and a partially saponified vinyl chloride-vinyl acetate copolymer containing at least 0.5% by weight of maleic acid, said binder being cross-linked and polymerized by radiation.

6 Claims, 1 Drawing Figure

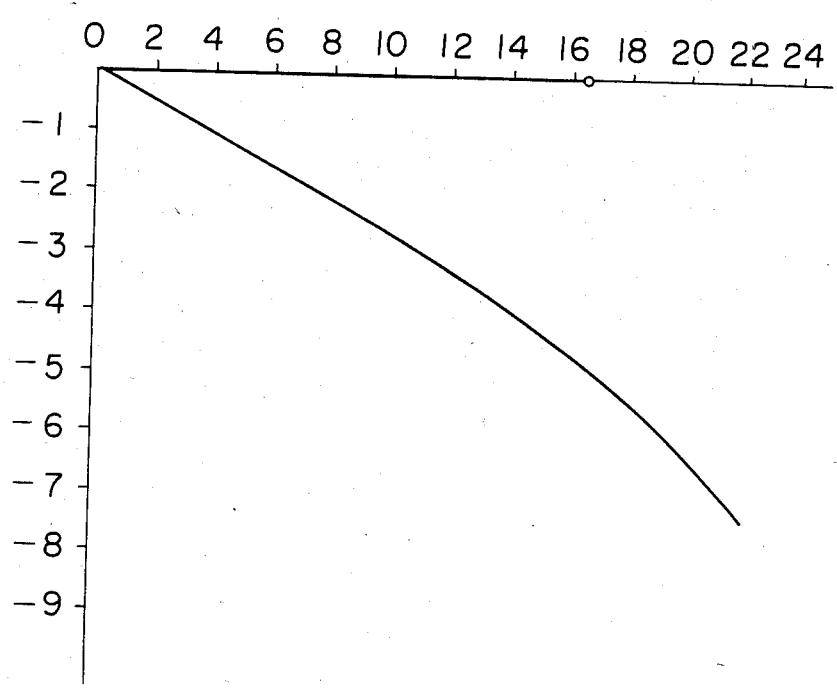

MAGNETIC RECORDING MEDIUM

BACKGROUND OF THE INVENTION

1. Field of the Invention

The present invention relates to a magnetic recording medium, and more particularly to a magnetic recording medium wherein a mixture of a radiation sensitive resin with a partially saponified vinyl chloride-vinyl acetate copolymer containing at least 0.5% by weight of maleic acid, is used as the binder to obtain good dispersibility of the magnetic particles in the magnetic layer, superior surface smoothness of the magnetic layer and superior durability of the medium.

2. Description of the Prior Art

Japanese patent application No. 27529/1980 discloses that when a combination of a radiation sensitive modified resin of e.g. acryl type with a radiation sensitive elastomer is used as a binder for a magnetic recording medium, and the binder is cured and the low molecular weight component therein is polymerized by the application of radiation, the following advantages are obtainable:

(A) The magnetic coating material and the coated magnetic layer have excellent chemical and physical stability, and therefore, they have no particular restriction during the pot life as the coating material or during the surface treatment of the coated magnetic layer until they are subjected to irradiation. Accordingly, by setting up the process so that the irradiation step comes after the necessary processing steps, it is possible to rationalize and automate of the production line and to ensure the quality control. (B) The cross-linking and the polymerization of the radiation sensitive binder take place in such a manner that when the binder is irradiated, radicals will be formed in the binder and they will be instantaneously cross-linked and polymerized, whereby the magnetic layer will be cured and dried. Thus, in order to generate the radicals, it is only required to instantaneously apply a radiation at a level of 20 Mrad at the maximum, whereby the substrate which is commonly made of a polyester film, will not undergo any heat deformation. Further, since the radiation is applied to a sheet material on line, it is possible to avoid a reduction of the yield due to the interlayer transfer of a non-uniform magnetic layer or tightening of the winding which are likely to be caused when the sheet material is subjected to heat curing after being wound-up in a form of a roll, or to prevent a decrease of the S/N ratio in the short wave region which is likely to be caused by a transfer of the surface roughness from the rear surface of the substrate. (C) As mentioned in (B), the reaction is a radical reaction, which does not require heating for a long period of time which used to be required to facilitate the reaction in the case of the conventional heat curing chemical reaction. Further, the cross-linking degree and the polymerization degree can thereby readily be controlled simply by adjusting the dose of the radiation, whereby it is possible to prevent such a trouble as adhesion due to exudation of the low molecular weight component from the magnetic layer. Thus, this process is advantageous also from the aspect of energy conservation in that the heat energy which used to be required for the heat curing step, can be saved. Whereas, in magnetic recording tapes, particularly in magnetic recording tapes for video, uniform dispersibility of the magnetic particles in the magnetic layer and a high degree of the surface smoothness of the magnetic layer are required to obtain a high reproduction output in a short wave region and to improve the S/N ratio. Further, with respect to the reliability and durability, the physical properties which are durable for a long period of time in repeated use, are required. In order to satisfy the above requirements, a number of combinations of various resins have been proposed for the binder for the magnetic layer. By these proposals, certain improvements have been made with respect to the physical properties. However, no adequate improvement has been achieved with respect to the dispersibility and the surface smoothness. For the improvement of the dispersibility, it has been proposed, for instance, to use a surface active agent as the dispersant, or to increase the content of hydrophilic groups (such as a OH group or a COOH group) in the molecule of the binder resin. The former proposal has difficulties such that by the presence of a low molecular weight surface active agent in the magnetic layer, the physical properties of the magnetic layer will be deteriorated or will undergo a change as time passes. In the latter proposal, a certain improvement has been observed, but no adequate dispersibility has been obtained particularly when a substance having poor dispersibility, such as carbon black, is incorporated or when a resin having poor dispersibility is used in combination. In general, if the dispersibility is improved, the surface smoothness will be improved likewise. Even when a resin having poor dispersibility is used, it is possible to reduce the modulation noise attributable to the surface smoothness, by using a substantial amount of a soft resin and conducting surface treatment such as calendering, but there still remains a noise due to the inadequate dispersion. Besides, when a soft resin is used in a substantial amount, the friction of the magnetic layer tends to increase, and the durability will be deteriorated.

SUMMARY OF THE INVENTION

Accordingly, it is an object of the present invention to overcome the above-mentioned difficulties and to provide a magnetic recording medium which is superior in the dispersibility and the surface smoothness as well as in the durability, by using a radiation sensitive resin which is subsequently cross-linked and polymerized by radiation.

Namely, the present invention provides a magnetic recording medium comprising fine ferromagnetic particles as the main component and a binder composed of a mixture of a radiation sensitive soft resin, a radiation sensitive modified resin and a partially saponified vinyl chloride-vinyl acetate copolymer containing at least 0.5% by weight of maleic acid, said binder being cross-linked and polymerized by radiation.

Further, the present invention provides a magnetic recording medium which has remarkably improved dispersibility and surface smoothness as well as excellent running durability, by cross-linking the above-mentioned binder with an isocyanate compound.

Now, the present invention will be described in detail with reference to the preferred embodiments.

BRIEF DESCRIPTION OF THE DRAWING

In the accompanying drawing, FIG. 1 is a graph in which the pot life of the magnetic coating material in Example 1 is compared with that in Comparative Example.

DETAILED DESCRIPTION OF THE INVENTION

A. The radiation sensitive resin or prepolymer includes the following:

(I) Polyurethane elastomers, prepolymers and telomers

Useful as such urethane compounds are polyurethane elastomers, prepolymers and telomers composed of condensation polymerization products of various polyisocyanates such as 2,4-toluene diisocyanate, 2,6-toluene diisocyanate, 1,3-xylene diisocyanate, 1,4-xylene diisocyanate, 1,5-napthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylbiphenylene diisocyanate, 4,4'-biphenylene diisocyanate, hexamethylene diisocyanate, isophorone diisocyanate, dicyclohexylmethane diisocyanate, Desmodule L and Desmodule N, with various polyesters such as a linear saturated polyester (a condensation polymerization product of a polyhydric alcohol such as ethylene glycol, diethylene glycol, glycerol, trimethylolpropane, 1,4-butanediol, 1,6-hexanediol, pentaerythritol, sorbitol, neopentyl glycol or 1,4-cyclohexane dimethanol, with a saturated polybasic acid such as phthalic acid, isophthalic acid, terephthalic acid, maleic acid, succinic acid, adipic acid or sebacic acid), a linear saturated polyester (polyethylene glycol, polypropylene glycol or polytetraethylene glycol), caprolactam, a hydroxyl-containing acrylic acid ester and a hydroxyl-containing methacrylic acid ester.

(II) Elastomers of acrylonitrile-butadiene copolymers

An acrylonitrile-butadiene copolymer prepolymer having terminal hydroxyl groups which is commercially available as POLY BD LIQUID manufactured by Sinclair Petrochemical Co., or an elastomer such as HYCAR 1432J manufactured by Nipponzeon Co., is particularly suitable as an elastomer component which is capable of being cross-linked and polymerized when the double bond in the butadiene is excited by electron beam to generate radicals.

Those having terminal hydroxyl groups are effective in that the radiation sensitivity can further be improved by addition of an acrylic unsaturated double bond by means of e.g. a diisocyanate.

(III) Polybutadiene elastomers

Low molecular weight prepolymers having terminal hydroxyl groups, such as POLY BD LIQUID RESIN R-15 manufactured by Sinclair Petrochemical Co., are particularly suitable in view of the compatibility with a thermoplastic resin and the affinity to the magnetic powder. The R-15 prepolymer has terminal hydroxyl groups, and accordingly its radiation sensitivity can further be improved by adding an acrylic unsaturated double bond to the terminal of the molecule whereby, the usefulness as the binder will be increased.

Further, CBR-M 901, i.e. a cyclization product of polybutadiene, manufactured by Nippon Synthetic Rubber Co., also exhibits a superior performance in combination with a thermoplastic resin. The cyclized polybutadiene has a particularly superior property as the binder in that the efficiency of the cross-linking polymerization by radiation is particularly good because of the radicals formed by the unsaturated double bonds of the original polybutadiene.

As other suitable thermoplastic elastomers and their prepolymers, elastomers such as chlorinated rubber, acryl rubber, isoprene rubber and its cyclization product (CIR 701 manufactured by Japan Synthetic Rubber Co. Ltd.), epoxy-modified rubber and internally plasticized saturated linear polyester (Byron #300 manufactured by Toyobo Co., Ltd.) may be effectively used for the present invention after they are subjected to radiation sensitive modification treatment which will be described hereinafter.

B. The above-mentioned radiation sensitive modification can be conducted, for instance, by introducing into the molecule a radiation cross-linkable or polymerizable group having a radical polymerizable unsaturated double bond such as an acrylic double bond attributable to e.g. acrylic acid, methacrylic acid or their ester compounds, an allyl-type double bond attributable to e.g. diallylphthalate, or an unsaturated bond attributable to e.g. maleic acid or maleic acid derivatives. Any other radiation cross-linkable or polymerizable unsaturated double bonds may likewise be employed.

More specifically, the radiation sensitive modification can be conducted in such a manner that one molecule of the above-mentioned thermoplastic resin or its prepolymer having at least one hydroxyl group is reacted firstly with at least one molecule of a polyisocyanate compound having an isocyanate group and then with at least one molecule of a monomer having a group reactive with the isocyanate group and an unsaturated double bond curable by radiation, to obtain a reaction product such as a linear polycaprolactone PCP-2000 (Chisso Corporation), and the reaction product is reacted with one molecule of toluene diisocyanate per one hydroxyl group of the reaction product and then with one molecule of 2-hydroxyethyl methacrylate to obtain a resin having at least two acrylic double bonds at its terminals, or its prepolymer, oligomer or telomer.

The polyisocyanate compound to be used here, includes 2,4-toluene diisocyanate, 2,6-toluene diisocyanate, 1,3-xylene diisocyanate, 1,4-xylene diisocyanate, m-phenylene diisocyanate, p-phenylene diisocyanate, hexamethylene diisocyanate, isophorone diisocyanate, or Desmodule L or IL (Bayer A.G., West Germany).

The monomer having a group reactive with the isocyanate group and an unsaturated double bond curable by radiation, includes an ester containing a hydroxyl group, such as a 2-hydroxyethyl ester, 2-hydroxypropyl ester or 2-hydroxyoctyl ester of acrylic acid or methacrylic acid; a monomer containing active hydrogen reactive with the isocyanate group and an acrylic double bond, such as an acrylamide, a methacrylamide or an N-methylolacrylamide; allyl alcohol; an ester compound of maleic acid with a polyhydric alcohol; and a monomer having active hydrogen reactive with the isocyanate group of e.g. a mono- or di-glyceride of a long chain fatty acid having an unsaturated double bond and containing an unsaturated double bond.

C. When a solvent is used in the present invention, the solvent may be a ketone such as acetone, methyl ethyl ketone, methyl isobutyl ketone or cyclohexanone; an alcohol such as methanol, ethanol, isopropanol or butanol which can not be used for the heat curing of the isocyanate; a solvent having an ether bond such as tetrahydrofuran or dioxane; a solvent such as dimethylformamide, vinylpyrolidone or nitropropane; or an aromatic hydrocarbon diluent or solvent such as toluene or xylene.

As the substrate for the coating, there may be employed a polyethyleneterephthalate film which is commonly used as the substrate for the magnetic recording medium. In the case where heat resistance is required, a polyimide film or polyamideimide film is advantageously be employed. In the case of a polyester film, a thin substrate may be prepared by subjecting the film to monoaxial or biaxial stretching treatment.

The present inventors have conducted extensive researches on how to introduce a functional group into a partially saponified vinyl chloride-vinyl acetate copolymer while maintaining the good dispersibility in the vinyl chloride-vinyl acetate copolymer and without leading to an increase of the glass transition temperature, and finally found that by incorporating at least 0.5% by weight of maleic acid into the vinyl chloride-vinyl acetate copolymer, it is possible to obtain a resin which provides good dispersibility and which has good calender processability, without any substantial change in the transition temperature (63° to 66° C.) The present invention has been accomplished based on this discovery.

Namely, the vinyl chloride-vinyl acetate copolymer containing at least 0.5% by weight of maleic acid provides a superior dispersibility and processability as a vinyl chloride-vinyl acetate copolymer. However, when used in combination with the resin having superior dispersibility as in the present invention, it provides a binder for a magnetic recording medium, which provides extremely high dispersibility of the magnetic particles.

While a combination of a polyurethane resin with a vinyl chloride-vinyl acetate copolymer provides an excellent property such as running durability for the binder of the magnetic recording medium, it does not provide adequate durability for the use at a high temperature (from 40° to 50° C.) among various environments in which the magnetic recording medium is used. The present invention provides an improvement also in this respect. Namely, cross-linking is conducted by means of an isocyanate compound, whereby a magnetic recording medium having superior durability as well as excellent dispersibility and surface smoothness, is obtainable. The isocyanate compound to be used in the present invention, is an isocyanate compound having at least two isocyanate groups or its adducts (such as a dimer or a trimer, or an adduct with a polyhydric alcohol such as a di- or tri-hydric alcohol).

The fine magnetic powder to be used in the present invention, is composed mainly of $\gamma$-$Fe_2O_3$, $Fe_3O_4$, Co-adsorbed $\gamma$-$Fe_2O_3$, Co-adsorbed $\gamma$-$Fe_2O_3$-$Fe_3O_4$ solid solution, $CrO_2$, Co compound-coated $\gamma$-$Fe_2O_3$, Co compound-coated $Fe_3O_4$ (the oxide includes the one falling between $Fe_3O_4$ and $\gamma$-$Fe_2O_3$, and the Co compound here is a compound, such as cobalt oxide, cobalt hydroxide, cobalt ferrite or a cobalt ion-adsorbed material wherein the magnetic anisotropy of cobalt is utilized for the improvement of the coercive force), or a ferromagnetic metal element such as Co, Fe-Co, Fe-Co-Ni or Co-Ni. As the method for the preparation of the magnetic powder, there may be mentioned a wet reduction method wherein a reducing agent such as $NaBH_4$ is used, a dry reduction method wherein the surface of iron oxide is treated with a Si compound and then with hydrogen gas, or a method wherein a vacuum evaporation is conducted in a low pressure argon gas stream. Further, fine powder of single crystal barium ferrite may also be used.

The above-mentioned fine magnetic particles may have an acicular shape or a spherical shape. The shape of the magnetic particle is selected depending upon the particular purpose of the magnetic recording medium.

The radiation cross-linkable or polymerizable binder of the present invention is particularly suitable for application to high bias HiFi audio cassette tapes, video cassette tapes or master tapes for contact transfer printing of video tapes, in which there have been remarkable technical progress and commercial developments in recent years. Namely, it is possible to obtain high performance tapes having excellent electromagnetic conversion characteristics and highly reliable physical properties by combining the radiation cross-linkable or polymerizable binder of the present invention with a cobalt-modified acicular iron oxide (i.e. cobalt-adsorbed type or cobalt compound-coated type) or fine acicular alloy particles having high coercive force among the above-mentioned fine magnetic powders.

Various additives such as antistatic agents, lubricants, dispersants or magnetic layer-reinforcing additives which are commonly used for binders of the magnetic recording medium, may optionally be incorporated into the radiation curable binder of the present invention.

As the active energy rays to be employed for the cross-linking of the magnetic layer of the present invention, electron beams generated from an electron accelerator are particularly useful for the reason described hereinlater. However, other rays such as $\gamma$-rays generated from $Co^{60}$, $\beta$-rays generated from $Sr^{90}$ or X-rays generated from an X-ray generator, may also be employed. As the radiation source, an electron beam accelerator is most advantageously employed from the viewpoints of the easy control of the dose of radiation, the self-shielding of ionized radiation for the introduction into the production line and the easy connection of various equipments of the production line with the sequence control. As the electron beam accelerator, there have been developed various accelerators such as Cock-Craft type, Van de Graff type, resonance transformer type, iron-core insulating transformer type or linear accelerator type, mainly depending upon the difference in the system of obtaining a high voltage.

However, most of magnetic recording media of general use are of the type having a magnetic layer as thin as at most 10 $\mu$m, and accordingly a high acceleration voltage exceeding 1,000 KV which is commonly used in the above-mentioned accelerators is not required, and an electron beam accelerator having a low acceleration voltage of at most 300 KV will suffice. The low acceleration voltage accelerator is advantageous not only in that the cost of the system itself is low but also in that the cost for the equipment for shielding ionized radiation is minimum.

Table 1 illustrates the advantage in the costs for the shielding equipment.

TABLE 1

| Acceleration voltage and thickness of the shielding material | | |
|---|---|---|
| Acceleration voltage | Shielding material | Thickness of the shielding material |
| 150 KV | Lead | 0.5 cm |
| 200 | " | 2 |
| 300 | " | 3 |
| 500 | Concrete | 85 |
| 750 | " | 110 |
| 1000 | " | 125 |

TABLE 1-continued

Acceleration voltage and thickness of the shielding material

| Acceleration voltage | Shielding material | Thickness of the shielding material |
|---|---|---|
| 2000 | " | 175 |
| 3000 | " | 190 |

Note:
This Table was taken from page 8 of the report of Radiation Utilization Study Group, Japan Atomic Energy Counsil, August 1979.

As shown in Table 1, in the case of an electron beam accelerator with at most 300 KV, it is possible to adequately shield the leakage of X-rays by covering the entire accelerator tube surrounding the electron beam irradiation section by means of a lead plate (the maximum thickness of 3 cm) as the shielding material. Thus, it is unnecessary to provide a separate expensive electron beam irradiation chamber. It is thereby possible to incorporate such a system as a one of the systems on the production line of the magnetic recording medium, whereby e.g. the drying and curing of a magnetic tape or magnetic sheet by electron beams can be conducted on-line. As such a specific system, an electron beam accelerator of low dose type (electro curtain system) manufactured by Energy Science Co., U.S.A or a self shielding scanning type electron accelerator of low dose type manufactured by Polymer Physics Co., West Germany, is suitable. When the above-mentioned binder layer is to be cured by means of an accelerator with a low voltage of from 150 to 300 KV, if the absorbed dose exceeds 5 Mrad, there will be a deterioration in the running durability under high temperature and high humidity conditions, whereby it is likely that the peeled magnetic layer will adhere to the head in the case of audio or memory tapes, or a similar adhesion is likely to occur to a rotary cylinder in the case of video tapes. Whereas, when the absorbed dose is within a range of from 0.5 to 5 Mrad, the density of the polymerization or cross-linking by the electron beams is proper, whereby the magnetic layer will have a proper balance of the flexibility and stiffness and the abrasion resistance between the magnetic layer and the head will be reduced, thus presenting a superior magnetic recording medium free from adhesion to the head or the cylinder.

Further, to conduct the cross-linking by radiation, it is important to apply the radiation to the recording medium in an inert gas stream such as nitrogen gas or helium gas. The magnetic layer having a high content of magnetic pigments, is highly porous, and accordingly if irradiated in air, the effective function of the radicals formed in the polymer, for the cross-linking reaction, will be hindered by e.g. $O_3$ formed by irradiation for the cross-linking of the binder composition.

Such an adverse effect hinders the cross-linking of the binder not only at the surface of the magnetic layer but also at the internal portion of the porous magnetic layer.

Accordingly, it is important to maintain the atmosphere for the irradiation of the active energy rays to be an inert gas atmosphere of e.g. nitrogen, helium or carbon dioxide having an oxygen concentration of at most 1%, preferably at most 3,000 ppm. As the isocyanate compound, there may be mentioned 2,4-tolylene diisocyanate, 2,6-tolylene diisocyanate, p-phenylene diisocyanate, polymethylenepolyphenyl diisocyanate, diphenylmethane diisocyanate, m-phenylene diisocyanate, butylene-1,4-diisocyanate, octamethylene diisocyanate, 3,3'-dimethoxy-4,4'-biphenylene-diisocyanate, 1,18-octadecamethylene-diisocyanate, polymethylenediisocyanate, naphthalene-2,4-diisocyanate, 3,3'-dimethyl-4,4'-biphenylene-diisocyanate, 1-methoxyphenylene-2,4-diisocyanate, diphenylene-4,4'-diisocyanate, 4,4'-diisocyanate-diphenylether, naphthalene-1,5-diisocyanate, diisocyanate-dicyclohexylmethane, p-xylene diisocyanate, m-xylene diisocyanate, diphenylene diisocyanate hydride, diphenylmethanediisocyanate hydride, benzene-triisocyanate, toluene-2,4,6-triisocyanate, 3-methyl-4,6,4'-triisocyanate diphenylmethane, 2,4,4'-triisocyanate-diphenyl, 2,4,4'-triisocyanate-diphenylether, a triisocyanate obtainable by the reaction of 3 moles of tolylene diisocyanate with one mole of trimethylol propane, Desmodule L (a 75% ethyl acetate solution, manufactured by Bayer A.G.), Desmodule N (i.e. a triisocyanate obtainable by the reaction of 3 moles of hexamethylene diisocyanate with one mole of water, manufactured by Bayer A.G.), toluene-2,4,6-triisocyanate, 3-methyl-4,6,4'-triisocyanate diphenylmethane, 2,4,4'-triisocyanate-diphenyl and 2,4,4'-triisocyanate-diphenylether.

Now, the present invention will be described in further detail with reference to Examples. However, it should be understood that the present invention is by no means restricted by these specific Examples.

EXAMPLE 1

|  | Parts by weight |
|---|---|
| Cobalt-adsorbed acicular $\gamma$-$Fe_2O_3$ (length: 0.4 $\mu$m, diameter: 0.05 $\mu$m, Hc: 600 Oe) | 120 |
| Carbon black (Antistatic, Mitsubishi Carbon black MA-600) | 5 |
| $\alpha$-$Al_2O_3$ powder (0.5 $\mu$m spherical) | 2 |
| Dispersant (Soybean oil purified lecithin) | 3 |
| Solvent (methyl ethyl ketone/ toluene: 50/50) | 100 |

The above components were mixed in a ball mill for 3 hours to sufficiently wet the acicular magnetic iron oxide with the dispersant.

Separately, a mixture having the following composition was thoroughly mixed and dissolved.

| Copolymer of partially saponified vinyl chloride-vinyl acetate copolymer with maleic acid (X % by weight) | 15 parts by weight |
|---|---|
| Acrylic double bond-containing polyester urethane elastomer (b) | 15 parts by weight (as solid) |
| Solvent (methyl ethyl ketone/ toluene: 50/50) | 200 parts by weight |
| Lubricant (higher fatty acid-modified silicone oil) | 3 parts by weight |

The solution thereby obtained was introduced into the ball mill containing the magnetic powder composition treated as mentioned above, and the mixture was thoroughly mixed and dispersed for 42 hours.

The magnetic coating material thus prepared, was coated on a polyester film having a thickness of 15 $\mu$m and oriented by a permanent magnet (1,600 gauss). After drying the solvent by an infrared lamp or by hot air, the magnetic layer was subjected to surface smoothing treatment and then electron beams were irradiated thereto in an nitrogen atmosphere having a residual oxygen concentration of 500 ppm at an acceleration voltage of 150 KV, at an electrode current of 10 mA and with a total dose of from 0.5 to 8 Mrad by means of an electro curtain type electron beam accelerator of ESI Co., to polymerize and cure the magnetic layer.

The tape thus obtained was cut into a video tape having a width of ½ inch (Sample No. 1).

When the amount of maleic acid was varied in Example 1, the results as shown in the following Table were obtained.

TABLE 2

| Vinyl chloride-vinyl acetate copolymer | | | | | | | |
|---|---|---|---|---|---|---|---|
| Maleic acid × % by weight | 0 | 0.5 | 1.0 | 1.5 | 2.0 | 2.5 | 3.0 |
| Dispersibility (orientation) | 1.90 | 2.15 | 2.15 | 2.20 | 2.25 | 2.25 | 2.30 |

As the maleic acid content in the vinyl chloride-vinyl acetate copolymer increases, the surface smoothness improves. However, the effect for the improvement of the surface smoothness reaches the saturated state when the maleic acid content exceeds about 0.5% by weight. The processability is also improved as compared with the one containing vinyl alcohol.

COMPARATIVE EXAMPLE 1

| | Parts by weight |
|---|---|
| Cobalt-adsorbed acicular γ-Fe$_2$O$_3$ (length: 0.4 μm, diameter: 0.05 μm, Hc: 600 Oe) | 120 |
| Carbon black (Antistatic, Mitsubishi Carbon black MA-600) | 5 |
| α-Al$_2$O$_3$ powder (0.5 μm spherical) | 2 |
| Dispersant (Soybean oil purified lecithin) | 3 |
| Solvent (methyl ethyl ketone/toluene: 50/50) | 100 |

The above components were mixed in a ball mill for 3 hours to adequately wet the acicular magnetic iron oxide with the dispersant.

Separately, a mixture having the following composition was thoroughly mixed and dissolved.

| | |
|---|---|
| Vinyl chloride-vinyl acetate copolymer (VAGH manufactured by Union Carbide Co.) | 15 parts by weight |
| Thermoplastic urethane resin, Nippolan 3022 manufactured by Nippon Polyurethane Co. | 15 parts by weight |
| Solvent (methyl ethyl ketone/toluene: 50/50) | 200 parts by weight |
| Lubricant (higher fatty acid-modified silicone oil) | 3 parts by weight |

The solution thus obtained was introduced into the mill containing the magnetic powder composition treated as above, and the mixture was thoroughly mixed and dispersed for 42 hours.

Then, 5 parts by weight (as solid) of an isocyanate compound (Desmodule L manufactured by Bayer A.G.) reactive and cross-linkable with functional groups, particularly hydroxyl groups, of the binder in the magnetic coating material, was added to the coating material in the ball mill and mixed for 20 minutes.

The magnetic coating material thus obtained was coated on a polyester film having a thickness of 15 μm and oriented by a permanent magnet (1600 gauss). After drying the solvent by an infrared lamp or by hot air, the roll film was held in an oven maintained at 80° C. for 48 hours to promote the cross-linking reaction by the isocyanate.

The tape thus obtained was cut into a video tape having a width of ½ inch (Sample No. A).

EXAMPLE 2

| | |
|---|---|
| Fe alloy acicular magnetic powder (length: 0.3 μm, diameter: 0.04 μm, Hc: 1000 Oe) | 120 parts by weight |
| Dispersant (oleic acid) | 2 parts by weight |
| Solvent (methyl ethyl ketone/toluene: 50/50) | 100 parts by weight |

The above components were mixed in a high power mixer for 3 hours to adequately wet the fine magnetic alloy powder with the dispersant.

Separately, a mixture having the following composition was thoroughly mixed and dissolved.

| | |
|---|---|
| A: Vinyl chloride-vinyl acetate copolymer containing 3% by weight of maleic acid | 10 parts by weight |
| B: Polyvinyl butyral resin (BL 3 manufactured by Sekisui Chemical Co. Ltd.) (5 molar % of an acetyl group, 40 molar % of a butyral group, 20 molar % of a formal group, 35 molar % of a hydroxyl group; polymerization degree: about 300) | 18 parts by weight (as solid) |
| C: Acrylic double bond-containing urethane elastomer (a) | 6 parts by weight (as solid) |
| Solvent (methyl ethyl ketone/toluene: 50/50) | 200 parts by weight |
| Lubricant (higher fatty acid) | 3 parts by weight |

The solution thereby obtained, was thoroughly mixed with the above magnetic powder composition by the high speed mixer for one hour, and then mixed and dispersed in a sand grinding mill for 4 hours. The magnetic coating material thus obtained was coated on a polyester film having a thickness of 12 μm, oriented in a magnetic field, dried to remove the solvent and subjected to surface smoothing treatment, and then electron beams were irradiated thereto in a nitrogen atmosphere at an acceleration voltage of 150 KV, at an electrode current of 10 mA and with an absorbed dose of 5 Mrad by means of an electro curtain type electron beam accelerator, to cure the magnetic layer.

The tape thus obtained was cut into an alloy audio cassette tape having a width of 3.8 mm (Sample No. 2).

TABLE 3

| | Characteristics of audio cassette tapes | | | | | | |
|---|---|---|---|---|---|---|---|
| | Hc (Oe) | Br (Guss) | Br/Bm | Br/Br | Electromagnetic conversion characteristics | | |
| | | | | | MoL 333 Hz (dB) | MoL 8 KHz (dB) | MoL 16 KHz (dB) |
| Example 2 | 1060 | 3500 | 0.82 | 2.10 | +4.0 | +7.5 | +12.0 |

TABLE 3-continued

| | Characteristics of audio cassette tapes | | | | | | |
|---|---|---|---|---|---|---|---|
| | | | | | Electromagnetic conversion characteristics | | |
| | Hc (Oe) | Br (Guss) | Br/Bm | Br/Br | MoL 333 Hz (dB) | MoL 8 KHz (dB) | MoL 16 KHz (dB) |
| Sample No. 2 Comparative Example Sample No. A | 1060 | 3200 | 0.80 | 1.90 | +3.2 | +6.0 | +11.0 |
| Notes | VSM-III Model manufactured by Tohei Kogyo K.K., Applied magnetic field: 5000 G | | | | Measured at the metal position by Cassette Deck Nakmichi 582 manufactured by Nakamichi Laboratory | | |

The characteristics of the alloy audio cassette tapes prepared in Example 2 and Comparative Example 1, are shown in Table 3.

As shown in Table 3, the tape of Example 2 wherein a partially saponified vinyl chloride-vinyl acetate copolymer containing 3% by weight of maleic acid, was used, is superior to the tape of Comparative Example 1 wherein no such copolymer was used, in the squareness (Br/Bm), the orientation (Br⊥/Br‖) and the residual magnetic flux density (Br). Further, an improvement was observed in the dispersibility of the magnetic particles.

The pot life of the magnetic coating material of the Example 1 was compared with the pot life of the Comparative Example. The results of the comparison are shown in FIG. 1 in the accompanying drawing. The characteristics of the tapes were as follows.

| Tapes | Electromagnetic conversion characteristics | | Orientation |
|---|---|---|---|
| Sample No. 1 (Video tape) | 4 MHz +1.9 dB | Y −S/N +2.0 dB | 2.20 |

From the above results, it is evident that when a combination of a radiation sensitive modified resin with a vinyl chloride-vinyl acetate copolymer containing at least 0.5% by weight of maleic acid is used for the binder, which is then cross-linked and polymerized by radiation, it is possible to obtain a magnetic recording medium having superior dispersibility and surface smoothness as well as excellent durability, and further that when an isocyanate compound is used as a cross-linking agent, the friction can be further reduced, thus presenting an improvement in the aspect of friction. Further, the pot life of the magnetic coating material is thereby improved.

Having thus described the invention with reference to the preferred examples, it should be understood that present invention is by no means restricted by these specific Examples, and various modifications may be made within the scope of the present invention. For instance, the maleic acid may contain maleic anhydride.

What is claimed is:

1. A magnetic recording medium comprising fine ferromagnetic particles as the main component and a binder composed of a mixture of a radiation sensitive resin, a radiation sensitive modified resin and a partially saponified vinyl chloride-vinyl acetate copolymer containing at least 0.5% by weight of maleic acid, said binder being cross-liked and polymerized by radiation.

2. The magnetic recording medium of claim 1, wherein an isocyanate compound is incorporated as a cross-linking agent, said agent being at least one member selected from the group consisting of 2,4-tolylene diisocyanate, 2,6-tolylene diisocyanate, p-phenylene diisocyanate, polymethylene-polyphenyl diisocyanate, diphenylmethane diisocyanate, m-phenylene diisocyanate, butylene-1,4-diisocyanate, octamethylene diisocyanate, 3,3'-dimethoxy-4,4'-biphenylene-diisocyanate, 1,18-octadecamethylene-diisocyanate, polymethylene-diisocyanate, napthalene-2,4-diisocyanate, 3,3'-dimethyl-4,4'-biphenylene-diisocyanate, 1-methoxyphenylene-2,4-diisocyanate, diphenylene-4,4'-diisocyanate, 4,4'-diisocyanate-diphenylether, napthalene-1,5-diisocyanate, diisocyanate-dicyclohexylmethane, p-xylene diisocyanate, m-xylene diisocyanate, diphenylene diisocyanate hydride, diphenylmethane-diisocyanate hydride, benzene-triisocyanate, toluene-2,4,6-triisocyanate, 3-methyl-4,6,4'-triisocyanate diphenylmethane, 2,4,4'-triisocyanate-diphenyl, 2,4,4'-triisocyanate-diphenylether, Desmodule L, Desmodule N, toluene-2,4,6-triisocyanate, 3-methyl-4,6,4'-triisocyanate diphenylmethane, 2,4,4'-triisocyanate-diphenyl, 2,4,4'-triisocyanate-diphenylether and mixtures thereof.

3. The magnetic recording medium of claim 1, wherein an isocyanate compound is incorporated as a cross-linking agent, said isocyanate compound being a triisocyanate obtainable by the reaction of three moles of tolylene diisocyanate with one mole of trimethylol propane or a triisocyanate obtained by the reaction of three moles of hexamethylene diisocyanate with one mole of water.

4. The magnetic recording medium or claim 1, wherein said binder comprises at least one member selected from the group consisting of a polyurethane elastomer having an unsaturated double bond, a polyurethane prepolymer having an unsaturated double bond, a polyurethane telomer having an unsaturated double bond, an elastomer of an acrylonitrile-butadiene copolymer having an unsaturated double bond, a polybutadiene elastomer having an unsaturated double bond, a chlorinated rubber having an unsaturated double bond, acryl rubber having an unsaturated double bond, and isoprene rubber having an unsaturated double bond.

5. The magnetic recording medium of claim 1 comprising as a cross-linking agent a compound having at least two isocyanate groups, a dimer of said compound, a trimer of said compound or an adduct of said compound with a polyhydric alcohol, wherein said polyhydric alcohol is a di-hydric alcohol or a tri-hydric alcohol.

6. The magnetic recording medium of claim 1, wherein said ferromagnetic particles comprise a fine powder a single crystal barium ferrite, $\gamma\text{-}Fe_2O_3$, $Fe_3O_4$, Co-absorbed $\gamma\text{-}Fe_2O_3$, Co-absorbed $\gamma\text{-}Fe_2O_3\text{-}Fe_3O_4$ solid solution, $CrO_2$, Co compound-coated $\gamma\text{-}Fe_2O_3$, Co compound-coated $Fe_3O_4$, Co, Fe-Co, Fe-Co-Ni, or Co-Ni.

* * * * *